United States Patent
Price et al.

(10) Patent No.: US 11,351,606 B2
(45) Date of Patent: Jun. 7, 2022

(54) POWDER HOT ISOSTATIC PRESSING

(71) Applicant: BAE Systems plc, London (GB)

(72) Inventors: Howard James Price, Blackburn (GB); John Chippendale, Blackburn (GB)

(73) Assignee: BAE Systems plc, London (GB)

(*) Notice: Subject to any disclaimer, the term of this patent is extended or adjusted under 35 U.S.C. 154(b) by 259 days.

(21) Appl. No.: 16/634,916

(22) PCT Filed: Aug. 2, 2018

(86) PCT No.: PCT/GB2018/052215
§ 371 (c)(1),
(2) Date: Jan. 29, 2020

(87) PCT Pub. No.: WO2019/025807
PCT Pub. Date: Feb. 7, 2019

(65) Prior Publication Data
US 2020/0230699 A1    Jul. 23, 2020

(30) Foreign Application Priority Data

Aug. 4, 2017 (EP) .................................... 17184844
Aug. 4, 2017 (GB) .................................... 1712524

(51) Int. Cl.
*B22F 3/15* (2006.01)

(52) U.S. Cl.
CPC .......... *B22F 3/15* (2013.01); *B22F 2003/153* (2013.01)

(58) Field of Classification Search
CPC ...... B22F 3/15; B22F 2003/153; B64C 3/182; B64C 1/12; B64C 3/20; B64C 3/26; B29D 99/014
See application file for complete search history.

(56) References Cited

U.S. PATENT DOCUMENTS

| 5,269,058 A | 12/1993 | Wiggs et al. |
| 2002/0122725 A1 | 9/2002 | Daam et al. |
| 2003/0133824 A1* | 7/2003 | Taguchi .................. C22C 38/22 420/70 |
| 2004/0200887 A1 | 10/2004 | Franchet et al. |
| 2007/0020134 A1 | 1/2007 | Pursell |

(Continued)

FOREIGN PATENT DOCUMENTS

| DE | 1439949 C1 | 2/1996 |
| EP | 1455965 A1 | 9/2004 |
| EP | 2910324 A2 | 8/2015 |

(Continued)

OTHER PUBLICATIONS (ASM Chapter 2: Thermal Expansion. pp. 9-17) (Year: 2002).*

(Continued)

*Primary Examiner* — Anthony J Zimmer
*Assistant Examiner* — Ricardo D Morales
(74) *Attorney, Agent, or Firm* — Maine Cernota & Rardin

(57) ABSTRACT

A method of manufacturing a part, the method involving providing an apparatus, the apparatus having a metal skin component; a metal HIP can and a hollow space between a portion of the HIP can and a portion of the skin component, the method further involving filling the HIP can with a metal powder; evacuating the HIP can; sealing the evacuated HIP can; and applying a HIP process to the apparatus in a HIP chamber so as to form the part.

15 Claims, 2 Drawing Sheets

(56) References Cited

U.S. PATENT DOCUMENTS

2009/0110556 A1    4/2009   Jahnz et al.
2020/0139439 A1*   5/2020   John ................. B22F 3/1283

FOREIGN PATENT DOCUMENTS

| GB | 2002817 A | 2/1979 |
| --- | --- | --- |
| GB | 2130245 A | 5/1984 |
| GB | 2517220 A | 2/2015 |
| JP | S62274006 A | 11/1987 |
| JP | 2007175736 A | 7/2007 |
| WO | 2010041957 A1 | 4/2010 |
| WO | 2013124314 A1 | 8/2013 |
| WO | 2016001368 A1 | 1/2016 |

OTHER PUBLICATIONS

PCT Search Report for Application No. PCT/GB2018/052215 dated Nov. 2, 2018, 15 pages.
European Search Report and Written Opinion for Application No. EP17184844.3 dated Feb. 23, 2018, 11 pages.
Great Britian Search Report for Application No. GB1712524.6 dated Feb. 1, 2018, 5 pages.
Search Report for Great Britain Patent Appl. No. 1812601.1, dated Dec. 7, 2018, 5 Pages.
International Preliminary Reporton Patentability for Application No. PCT/GB2018/052215 dated Feb. 4, 2020, 10 pages.

* cited by examiner

POWDER HOT ISOSTATIC PRESSING

RELATED APPLICATIONS

This application is a national phase application filed under 35 USC § 371 of PCT Application No. PCT/GB2018/052215 with an International filing date of Aug. 2, 2018, which claims priority of GB Patent Application 1712524.6 filed Aug. 4, 2017 and EP Patent Application 17184844.3 filed Aug. 4, 2017. Each of these applications is herein incorporated by reference in its entirety for all purposes.

FIELD OF THE INVENTION

The present invention relates to the manufacture of parts using Hot Isostatic Pressing, and in particular relates to the formation of hollow section parts by powder Hot Isostatic Pressing (HIP).

BACKGROUND

In powder HIP, metal powder is compacted using heat and pressure into a solid metal component. The powder is placed into a container, known as a can, which is shaped according to the desired component's shape. The can containing the powder is evacuated to remove any gaseous elements and then sealed and held at a high pressure and temperature. The powder particles fuse and diffusion bond into a solid mass producing a component having an external shape defined by the internal shape of the can.

In a particular example of this process, steel cans are often used, when using titanium powder, and these can be removed from the titanium part, after cooling, by acid etching to provide a clean part. However, the mismatched thermal expansion coefficients of titanium and steel present problems when trying to form complex parts using for example titanium powder and a steel can. These problems could be encountered for all metals with mismatched thermal expansion coefficients.

Hollow-section parts are also extremely hard to manufacture using conventional powder HIP processes due to difficulties in forming moulds and removing can material from the internal regions.

There is therefore a requirement for an improved method of forming metal parts, particularly hollow (and thus lightweight) metal parts using powder HIP.

SUMMARY OF THE INVENTION

The present invention provides a method of manufacturing a part, the method comprising the steps of: providing an apparatus, the apparatus comprising: a skin component formed of a metal sheet having a first side and a second side; a HIP can formed of metal and having a first side and a second side; wherein the second side of the HIP can is joined to the first side of the skin component, and wherein the HIP can defines a sealed volume and wherein the HIP can comprises a filling means to fill the sealed volume with metal powder; wherein there is a hollow space between a portion of the second side of the HIP can and a portion of the first side of the skin component, and the apparatus further comprises a vent into the hollow space to allow pressure applied during the HIP process to be communicated into the hollow space. The method further comprises filling the HIP can with a metal powder; evacuating the HIP can; sealing the evacuated HIP can; and applying a HIP process to the apparatus in a HIP chamber so as to form the part.

The HIP can may be welded to the skin.

The HIP can may be welded to the skin using electron beam welding.

The skin component may form part of the wall of the HIP can to define the sealed volume.

The filling means may be sealable to prevent gas communication between the sealed volume and the exterior of the HIP can during HIP processing.

The HIP can may not be subsequently removed after the HIP process.

The skin component, the HIP can and the metal powder may be formed from or metals with substantially the same thermal expansion properties. "Substantially the same thermal expansion properties" may mean that the skin and HIP can and metal powder are made of metals which have the same thermal expansion coefficient (TEC) or have a TEC that is similar to each other (for example, the differential TEC may be up to about ±5, 10, 15%, preferably no more than about ±15%). Preferably the skin component, the HIP can and the metal powder are formed from metals with the same thermal expansion coefficient ±15% differential.

The skin (the skin component), the HIP can and the metal powder may be formed from the same metal. The metals or the same metal may be selected from the group consisting of nickel, cobalt, titanium, iron, aluminium and alloys thereof and combinations thereof. For example, a steel, a superalloy or a titanium alloy.

The skin component, the HIP can and the metal powder may be formed from the same titanium alloy. The skin component, the HIP can and the metal powder may be formed from an alpha-beta titanium alloy. The skin component, the HIP can and the metal powder may be formed from a titanium/aluminium/vanadium alloy such as a Ti-6Al-4V alloy or SP-700 (Ti-4.5Al-3V-2Mo-2Fe).

The particle size of the metal power may be selected to provide the desired properties of the finished article/unitary component. For example, a fine powder (with particle size of for example 20 to 500 microns) may be used to form a fine grain, high strength alloy.

Applying the HIP process to the apparatus in a HIP chamber may change the apparatus to the part, wherein the hollow part of the apparatus becomes the hollow part of part.

Applying the HIP process to the apparatus in a HIP chamber may consolidate the HIP can with the metal powder and may consolidate the portion of the second side of the HIP with the first side of the skin component at the points of contact.

The part may be a hollow part. The part may be an aircraft part, for example an aircraft stringer consolidated with an aircraft skin.

Prior to applying the HIP process, the apparatus may be attached to the base plate using a vacuum. The vacuum acts to create a vacuum seal thus ensuring that the apparatus is securely held in place.

The HIP process is carried out under pressure. For example, in the case of titanium (where a good diffusion bonding response is available) the pressure may be substantially reduced, such as about 50 MPa. More normally, however, the pressure is approximately 100 MPa to 200 MPa. For example, for nickel superalloys the pressure used is approximately 100 MPa. In the case of aluminium, however, the pressure may have to be as high as approximately 200 MPa.

The HIP process may be carried out at a temperature of between 450° C. to 1400° C., again dependent on the material being processed.

Providing the apparatus may comprise forming a skin component from a metal sheet, the metal sheet having a first side, a second side and a vent component through the first and second sides; forming a HIP can from metal, which HIP can has a first side, a second side, a sealed volume and a filling means; joining the second side of the HIP can to the first side of the skin component so as to align the vent into the hollow space and so as to form a hollow space between a portion of the second side of the HIP can and a portion of the first side of the skin component.

The present invention also provides an apparatus for producing a part; the apparatus comprising a skin component formed of a metal sheet having a first side and second side; a HIP can formed of metal and having a first side and a second side; wherein the second side of the HIP can is joined to the first side of the skin component, the HIP can defines a sealed volume and the HIP can comprises a single means configured to fill the sealed volume with metal powder, configured to evacuate the HIP can and configured to seal the evacuated HIP can; wherein there is a hollow space between a portion of the second side of the HIP can and a portion of the first side of the skin component. The apparatus further comprises a vent into the hollow space configured to allow pressure applied during the HIP process to be communicated into the hollow space; and pressure means configured to apply a HIP process.

The present invention also provides a system for producing a part; the system comprising an apparatus comprising a skin component formed of a metal sheet having a first side and second side; a HIP can formed of metal and having a first side and a second side; wherein the second side of the HIP can is joined to the first side of the skin component, the HIP can defines a sealed volume and the HIP can comprises a single means configured to fill the sealed volume with metal powder, configured to evacuate the HIP can and configured to seal the evacuated HIP can; wherein there is a hollow space between a portion of the second side of the HIP can and a portion of the first side of the skin component. The apparatus further comprises a vent into the hollow space configured to allow pressure applied during the HIP process to be communicated into the hollow space; and the system further comprises pressure means configured to apply a HIP process to the apparatus so as to produce the part.

The present invention also provides an apparatus for forming a unitary component (a part) using powder Hot Isostatic Pressing (HIP), the apparatus comprising a skin component formed of a metal sheet having a first side and a second side; and a HIP can formed of metal and having a first side (for example, an outer part) and a second side (for example, an inner part), the second side of the HIP can being attached to the first side of the skin component, the HIP can defining a sealed volume and comprising a filling means to fill the sealed volume with metal powder; wherein the skin and HIP can are arranged to form a unitary component upon application of a HIP process. Used herein "can" refers to a container preferably shaped (and thus having a geometry) corresponding to the desired component's shape.

A hollow space may be formed between a portion of the second side of the HIP can and a portion of the first side of the skin component, and the apparatus is provided with a vent into the hollow space to allow pressure applied during the HIP process to be communicated into the hollow space.

The HIP can may be welded to the skin.

The HIP can may be welded to the skin using electron beam welding.

The skin may form part of the wall of the HIP can to define the sealed volume.

The filling means may be sealable to prevent gas communication between the sealed volume and the exterior of the HIP can during HIP processing.

The skin and HIP can may be formed from metals with substantially the same thermal expansion properties. "Substantially the same thermal expansion properties" may mean that the skin and HIP can are made of metals which have the same thermal expansion coefficient (TEC) or have a TEC that is similar to each other (for example, the differential TEC may be up to about ±5, 10, 15%, preferably no more than about ±15%).

The skin and HIP can may be formed from the same metal.

The skin and HIP can may be formed from the same metal, wherein the same metal is selected from the group consisting of nickel, cobalt, titanium, iron, aluminium and alloys thereof and combinations thereof. For example, a steel, a superalloy or a titanium alloy.

The skin and HIP can may be formed from an alpha-beta titanium alloy. The skin and HIP can may be formed from a titanium/aluminum/vanadium alloy such as a Ti-6Al-4V alloy or SP-700 (Ti-4.5Al-3V-2Mo-2Fe).

The HIP can may be filled with metal powder.

The HIP can may be filled with metal powder of the substantially the same composition as the metal of the HIP can and/or skin. The HIP can may be filled with metal powder which has substantially the same thermal expansion coefficient as the HIP can and/or skin. "Substantially the same thermal expansion properties" may mean the same thermal expansion coefficient (TEC) or a similar TEC (for example, the differential TEC may be up to about ±5, 10, 15%, preferably up to about ±15%).

The metal powder may be selected from the group consisting of nickel, cobalt, iron, aluminium and alloys thereof or combinations thereof, for example a titanium alloy, a steel, or a superalloy (such as a nickel or cobalt superalloy).

The metal powder may be a titanium alloy. The metal powder may be an alpha-beta titanium alloy.

The metal powder may be a titanium/aluminium/vanadium alloy, such as a Ti-6Al-4V alloy or Ti-4.5Al-3V-2Mo-2Fe.

The particle size of the metal power is selected to provide the desired properties of the finished article/unitary component. For example, a fine powder (with particle size of for example 20 to 500 microns) may be used to form a fine grain, high strength alloy.

The present invention also provides a method of manufacturing a unitary component utilising Hot Isostatic Pressing, the method comprising the steps of providing an apparatus as described herein, filling the HIP can with a metal powder; evacuating the HIP can; sealing the evacuated HIP can; and applying a HIP process to the apparatus in a HIP chamber.

The metal powder may be of substantially the same, or exactly the same, composition (and thus have the same or a similar TEC) as the HIP can and/or skin.

The method may further comprise the step of attaching the apparatus to a base plate.

The apparatus may be attached to the base plate using a vacuum. The vacuum acts to create a vacuum seal thus ensuring that the apparatus is securely held in place.

The HIP process is carried out under pressure. For example, in the case of titanium (where a good diffusion bonding response is available) the pressure may be substantially reduced, such as about 50 MPa. More normally, however, the pressure is approximately 100 MPa to 200 MPa. For example, for nickel superalloys the pressure used is approximately 100 MPa. In the case of aluminium, however, the pressure may have to be as high as approximately 200 MPa.

The HIP process is carried out at a temperature of between 450° C. to 1400° C., again dependent on the material being processed.

The present invention also provides an aircraft part produced by the as defined apparatus or methods.

DETAILED DESCRIPTION

The present invention relates to an improved HIP process for the formation of metal parts, for example titanium parts. The process enables the fabrication of complex parts, with hollow sections, while avoiding the difficulties of the prior art.

The present disclosure describes below a titanium can with a substantially similar thermal expansion coefficient to the titanium powder used in the HIP process, so that the part being formed (for example an aircraft skin and stringer), and the can, expand and contract at substantially similar rates. Removal of the can as in the prior art may not be necessary due to features of the fabrication process described below. Accordingly, in the process of the present invention, preferably the HIP can is not subsequently removed after the HIP process.

In a specific example a superplastically formed can is used in conjunction with a skin component to form a unitary/consolidated component, which is a unitary/consolidated skin and stringer (stiffener) structure having a hollow region within the unitary/consolidated component/part. The production technique allows the fabrication of large components with complex shapes and hollow sections using a single process sequence.

Figure 1:
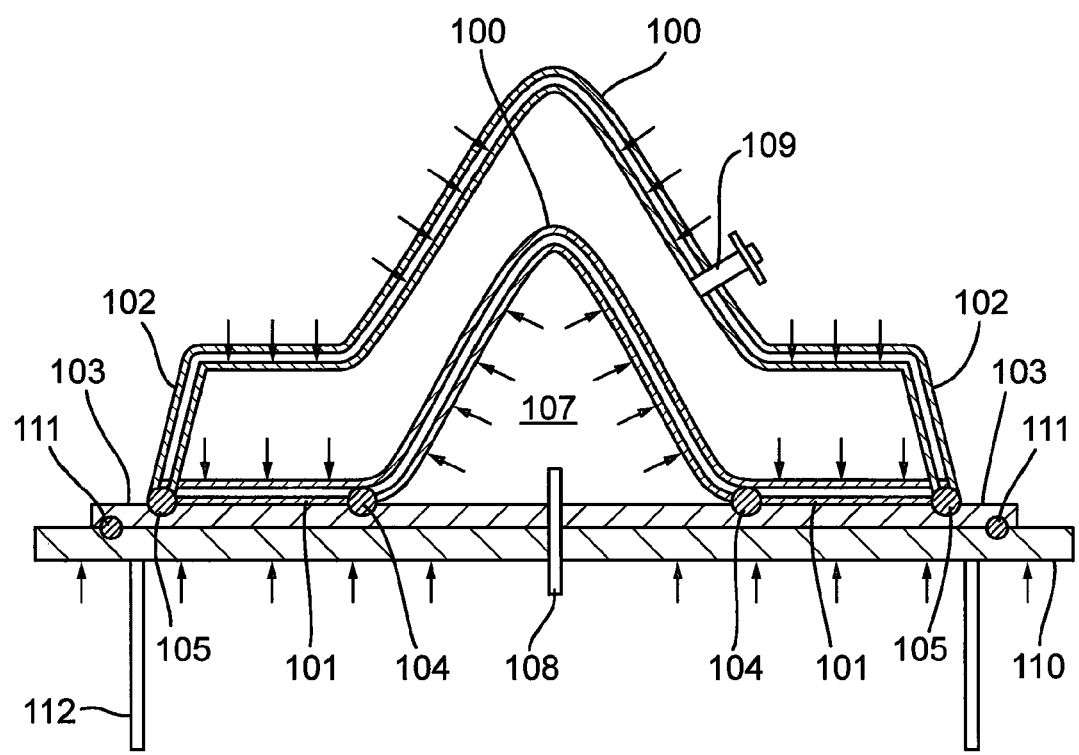
FIG. 1 shows a schematic cross section of an apparatus according to the current disclosure.

FIG. 1 shows a schematic cross-section of an example of a production apparatus for forming a component according to the processes and techniques described herein.

The particular example of FIG. 1 is for the production of a skin and stringer assembly, for example for use in an aircraft. A can 100 is made from a titanium alloy of similar composition to the titanium powder which will fill it and form the component after HIP processing. For example a titanium/aluminium/vanadium alloy, such as a Ti-6Al-4V alloy may be utilised for both the powder and the can 100. The can 100 may be formed using a superplastic forming process which is capable of forming components requiring no, or minimal, post processing. Other techniques which are capable of producing a can 100 of appropriate dimensions which will form part of the final product may also be utilised, for example additive layer manufacturing.

The can 100 comprises an inner part 101 and outer part 102. The inner part 101 is mounted to a skin 103. The inner part 101 is joined to the skin 103 along line 104 (perpendicular to the plane of the drawing). The outer part 102 is joined to the skin 103 and inner part 101 at line 105. Joints 104 and 105 form gas-tight seals. Electron beam (stake) welding (a fusion welding process utilising an electron beam) is particularly appropriate for forming joints 104, 105 as it is usually conducted in a vacuum, but any other suitable joining process which provides a gas tight seal may be utilised. An advantage of using electron beam welding under vacuum (and with the adjacent surfaces of the inner part 101 and the skin 103 in a clean and essentially oxide-free condition) is that the inner part 101 and skin 103 will diffusion bond together during the HIP process since the surfaces will be both clean and free from gaseous elements that might otherwise either contaminate the surfaces at temperature or might be insoluble in titanium and form gas entrapment features. The electron beam process also maintains a clean and oxide-free surface for the can 100 which is required for HIP processing.

In the example of FIG. 1 the outer part 102 is joined to the edge of the inner part 101 and to the skin 103 at the same location (joint 105). However, this arrangement depends on the component design. For example, the outer part 102 may be joined to the inner part 101 away from the edge of the inner part 101, or the outer part 102 may be joined directly to the skin 103. Furthermore, the region of material of the inner part 101 between the two joins 104, 105 in FIG. 1 may be omitted such that the skin 103 forms a section of the can 100.

Any hollow zones, such as hollow zone 107 between the skin 103 and the inner part 101, must each be vented such that the externally applied pressure from the HIP process will be communicated to the hollow zone 107 to act upon the outer surface of can 100. The hollow zone 107 is thus vented by a vent pipe 108. Although not visible in the cross section of FIG. 1 the hollow zone 107 may be divided into sections by further features of the component and thus multiple vents may be required to ensure all hollow zones are vented. The vent pipe 108 may be welded to the lower skin 103, it may be a "loosely" fitted (i.e. no welding or attachment means) or alternatively the vent pipe may be an open hole (so long as it aligns with an opening in the support plate 110). After the HIP process, dependant on what form the vent pipe 108 takes, the vent pipe may be drilled out, left open or plugged with, for example, a fastener or a weld.

A fill pipe 109 is provided for filing the can 100 with metal powder. The fill pipe 109 may be provided as is known in the art for conventional HIP cans and is of a type which may be sealed prior to HIP processing. The fill pipe 109 may also be utilised to evacuate the can 100 prior to sealing and HIP processing. As such the fill pipe 109 is shaped and located so as to permit filling of the can 100 with metal powder and to permit evacuation of the can 100. Preferably the fill pipe 109 is welded to the can 100. In other words, the fill pipe 109 will be substantially full of powder prior to the HIP process and will also be evacuated and sealed. After the HIP process, the metal powder and pipe will be consolidated and form an integral feature of the final part. Any protruding parts of the pipe (protruding beyond the outer walls of the can 100 (and now final part) may be trimmed flush with the can (final part).

During HIP processing, powder particles within the can 100 diffusion bond together and diffusion bond to the walls of the can 100, thus forming a solid item. The inner part 101 also diffusion bonds to the skin at the points of contact. A unitary/consolidated component/part is thus formed comprising the skin 103 and can 100 (which after HIP processing is solid) parts. As described above the can 100 is formed by a process which allows the can 100 to form part of the component, for example a superplastic process using a metal or an alloy matched to that of the powder is particularly appropriate. The resulting component thus needs minimal post-processing, and in particular there is no need to remove the can 100 from within the hollow zone 107. This is a particular advantage since removing conventional cans from hollow zones is problematic as the etch process is difficult to control and machining within a hollow zone is difficult or near impossible. Further it is particularly advantageous to use matching or similar TECs for the can 100, skin 103 and/or metal powder as it results in a finished article (unitary component) that is less likely to have defects as a result of mismatched TECs. This is particularly advantageous in hollow unitary components which can be susceptible to damage such as buckling.

For application of the HIP process the skin 103 and can 100 assembly (the apparatus) is mounted on a support plate 110. An interface layer is provided between the support plate 110 and the skin 103, to inhibit the formation of a diffusion bond between these surfaces during the HIP process. For example, an yttria stop-off compound may be utilised, or any other suitable interface layer to inhibit a diffusion bond. The support plate 110 may also be formed from titanium, but any suitable material may be utilised. It is preferable that the support plate 110 has a similar or same coefficient of thermal expansion to the material used for the component being manufactured.

The support plate 110 may have the desired final contour form of the skin 103. Although the skin 103 in the example is flat, the same processes and principles described above may be utilised with a non-flat skin. In such examples the support plate 110 may match the shape of the skin 103 to provide even support.

Optionally, a seal 111 is provided and the area within that seal 111, between the skin 103 and support plate 110, is evacuated via vacuum pipe 112 to hold the skin 103 on the support plate 110. The seal 111 may allow some movement between the skin 103 and support plate 110 to allow for differential expansion and contraction between the skin 103 and support plate 110. Such a system provides an even force for retaining the skin 103 in location. Other methods of holding the skin 103 in place may also be utilised. In so doing, compaction of the powder, which will cause overall shrinkage relative to the initial geometric form, may then be constrained to cause movement solely in the direction onto the base plate so as to better manage such dimensional and geometric change.

The skin 103 and can 100 assembly, on support plate 110, are placed within a HIP vessel and a HIP process applied to the parts to form the unitary stringer and skin component. In an alternative process the skin 103 and can 100 assembly may be placed on a support plate in the HIP chamber.

Figure 2:
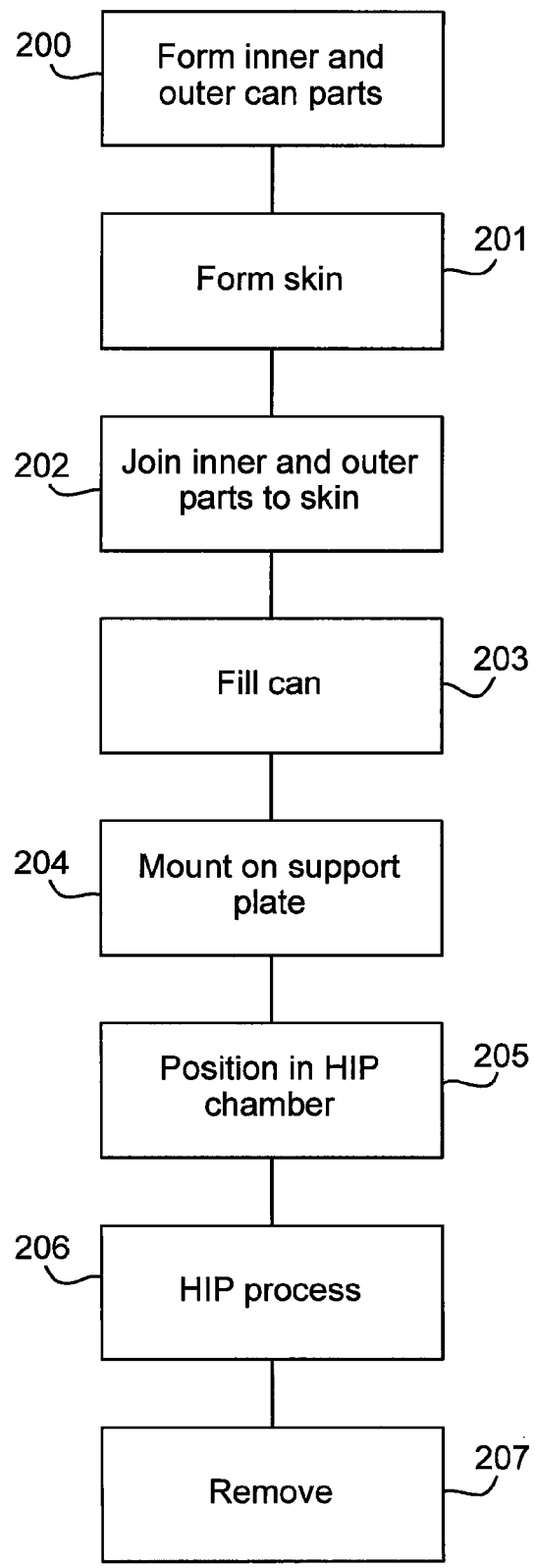
FIG. 2 shows a flow chart of a production process.

FIG. 2 shows a flow chart of a process utilising the apparatus of FIG. 1. At step 200 inner 101 and outer parts 102 of the can 100 are formed, for example using a superplastic forming process and separate forming dies. At step 201 the skin 103 is formed to the required shape. This is achieved by any known process in the art, such as rolling, superplastic forming or additive layer manufacturing. At step 202 the inner part 101 of the can 100 is joined to the skin 103 and the outer part 102 is joined to the skin 103 and/or inner part 101 to form a sealed can 100.

At step 203 the can 100 is filled with powder using known techniques to ensure complete filling and then may be either directly evacuated or alternatively pre-flushed with an inert gas, such as argon, prior to evacuation. Evacuation can be achieved by any known process in the art, such as using vacuum apparatus. The fill pipe 109 is then sealed, for example by mechanically crimping the end of the fill pipe 109. Pre-flushing with an inert gas such as argon (before evacuation and the fill pipe 109 being sealed) helps ensure a lower level of interstitial element take-up. This is particularly advantageous if fracture toughness is a critical factor in the design of the finished article.

At step 204 the assembly is mounted on a support plate 110 with an appropriate interface layer. At step 205 the support plate 110 and assembly is positioned in a HIP chamber (in an alternative method the support plate 110 may be static in the HIP chamber and the assembly mounted on it in position), and all appropriate vent and pressure connections are made.

At step 206 the assembly is subjected to a HIP process of pressure application and heating to a temperature sufficient to cause the powder particles to fuse and diffusion bond. The time, temperature and pressure will depend on the metal/alloy composition and characteristics, such as powder particle size, melting point etc. In an example process for titanium, pressures typically in excess of about 50 MPa, preferably about 100 MPa may be applied, at a temperature of approximately 900-930° C. The pressure applied to the outside surface of the outer part 102 is transmitted through the outer part 102 to diffusion bond the outer part 102 to the consolidated powder. The pressure is also transmitted through the consolidated powder to diffusion bond the inner part 101 to the consolidated powder, and to diffusion bond the inner part 101 to the skin 103. The pressure and temperature are held for a sufficient amount of time (for example about 1-2 hours) to effect full diffusion bonding of both the powder itself and the powder to each of the can parts 101, 102. The pressure may either be maintained or reduced prior to, during or after the temperature is reduced back to ambient levels. At step 207 the pressure is then released and the temperature is allowed to drop back to ambient temperature, and the component/part can be removed.

A unitary component comprising the skin and stringer (including a plurality of stringers or other such stiffening forms), with hollow sections, is thus formed which requires only minimal post-processing.

In the above examples the can 100 is formed using a superplastic forming process (the can is heated up to promote super plasticity in the metal/alloy and then while soft the can is shaped, for example by thermoforming, blow forming, or vacuum forming. Other forming techniques may be utilised such as casting. However, significant post-processing may be required, and such methods are known to provide components which can present difficulties during HIP processing. For example voids may be present in the cast can which require specific processing. It is therefore preferred within the context of the present invention that the can and/or skin is made from a technique that requires minimal post processing (post processing such as grinding, etching or machining). Suitable examples include superplastic forming or additive layer manufacturing (ALM).

The unitary component/part (finished article) manufactured by the apparatus and process of the present invention will have a good surface finish (comparable to that of a superplastically formed part), which requires minimal or no post processing.

The above description has been given with particular reference to the formation of titanium parts, but the same principles and apparatus can be applied to other metals which are suitable for HIP processing, such as nickel, cobalt, titanium, iron, aluminium and alloys thereof and combinations thereof (for example, a steel, a superalloy, such as a nickel or cobalt based superalloy, or a titanium alloy).

Similarly the apparatus may be applied to any component shape to which the principles are applicable.

The titanium alloys of choice remain open to the user but Ti-6Al-4V alloy is available in both SPF-grade sheet and also in powder form and so is seen as being a particularly suitable combination. There may also be merit for some applications for Ti-alloy powder being contained within commercially pure forms of titanium cans if there was a desire to combine a higher strength core with a softer grade of inner and/or outer material.

The term "skin" has been used to describe part 103, but as will be appreciated this does not restrict the part to being a skin in the final product (although it may be) but is used for descriptive purposes only. In the general sense the skin is a planar, sheet, layer which may be flat or shaped.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality. In the claims, the term 'comprising' or "including" does not exclude the presence of other elements.

The invention claimed is:

1. A method of manufacturing a part, the method comprising the steps of:
    providing an apparatus, the apparatus comprising:
    a skin component formed of a metal sheet having a first side and a second side;
    a HIP can formed of metal and having a first side and a second side;
    wherein the second side of the HIP can is joined to the first side of the skin component, and wherein the HIP can defines a sealed volume and wherein the HIP can comprises a filling means to fill the sealed volume with metal powder;
    wherein there is a hollow space between a portion of the second side of the HIP can and a portion of the first side of the skin component, and the apparatus comprises a vent into the hollow space to allow pressure applied during the HIP process to be communicated into the hollow space;
    filling the HIP can with a metal powder;
    evacuating the HIP can;
    sealing the evacuated HIP can; and
    applying a HIP process to the apparatus in a HIP chamber so as to form the part,
    wherein the part is a hollow part.

2. The method according to claim 1, wherein the HIP can is electron beam welded to the skin.

3. The method according to claim 1, wherein the HIP can is not subsequently removed after the HIP process.

4. The method according to claim 1, wherein the skin component, the HIP can and the metal powder are formed from metals with the same thermal expansion coefficient ±15% differential.

5. The method according to claim 1, wherein the skin component, the HIP can, and the metal powder are formed from the same metal.

6. The method according to claim 1, wherein the skin component, the HIP can and the metal powder are formed from the same titanium alloy.

7. The method according to claim 1, wherein applying the HIP process to the apparatus in a HIP chamber changes the apparatus to the part and wherein the hollow part of the apparatus becomes the hollow part of part.

8. The method according to claim 1, wherein applying the HIP process to the apparatus in a HIP chamber consolidates the HIP can with the metal powder and consolidates the portion of the second side of the HIP can with the first side of the skin component at the points of contact.

9. The method according to claim 1, wherein the part is an aircraft part.

10. The method according to claim 9, wherein the part is an aircraft stringer consolidated with an aircraft skin.

11. The method according to claim 1, further comprising attaching the apparatus to a base plate using a vacuum prior to applying the HIP process.

12. The method according to claim 1, wherein providing the apparatus, comprises
    forming a skin component from a metal sheet, the metal sheet having a first side, a second side, and a vent component through the first and second sides;
    forming a HIP can having a first side, a second side, a sealed volume, and a filling means from metal;
    joining the second side of the HIP can to the first side of the skin component so as to align the vent into the hollow space and so as to form a hollow space between a portion of the second side of the HIP can and a portion of the first side of the skin component.

13. An aircraft part produced by the method as defined in claim 1.

14. A method of manufacturing a part, the method comprising the steps of:
    providing an apparatus, the apparatus comprising:
    a skin component formed of a metal sheet having a first side and a second side;
    a HIP can formed of metal and having a first side and a second side;
    wherein the second side of the HIP can is joined to the first side of the skin component, and wherein the HIP can defines a sealed volume and wherein the HIP can comprises a filling means to fill the sealed volume with metal powder;
    wherein there is a hollow space between a portion of the second side of the HIP can and a portion of the first side of the skin component, and the apparatus comprises a vent into the hollow space to allow pressure applied during the HIP process to be communicated into the hollow space;
    filling the HIP can with a metal powder;
    evacuating the HIP can;
    sealing the evacuated HIP can; and
    applying a HIP process to the apparatus in a HIP chamber so as to form the part,
    wherein the part is an aircraft part.

15. A method of manufacturing a part, the method comprising the steps of:
    providing an apparatus, the apparatus comprising:
    a skin component formed of a metal sheet having a first side and a second side;
    a HIP can formed of metal and having a first side and a second side;
    wherein the second side of the HIP can is joined to the first side of the skin component, and wherein the HIP can defines a sealed volume and wherein the HIP can comprises a filling means to fill the sealed volume with metal powder;

wherein there is a hollow space between a portion of the second side of the HIP can and a portion of the first side of the skin component, and the apparatus comprises a vent into the hollow space to allow pressure applied during the HIP process to be communicated into the hollow space;

filling the HIP can with a metal powder;

evacuating the HIP can;

sealing the evacuated HIP can;

attaching the apparatus to a base plate using a vacuum; and applying a HIP process to the apparatus in a HIP chamber so as to form the part.

\* \* \* \* \*